(12) United States Patent
Molaskey et al.

(10) Patent No.: US 7,286,236 B2
(45) Date of Patent: Oct. 23, 2007

(54) DETECTING RADIATION EVENTS IN A RING LASER GYROSCOPE

(75) Inventors: Clifford T. Molaskey, St. Petersburg, FL (US); Douglas A. Chamberlin, Trinity, FL (US); Paris Wiley, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 331 days.

(21) Appl. No.: 10/966,634

(22) Filed: Oct. 15, 2004

(65) Prior Publication Data

US 2006/0082780 A1     Apr. 20, 2006

(51) Int. Cl.
    *G01C 19/66* (2006.01)
(52) U.S. Cl. .................................... 356/459
(58) Field of Classification Search ............... 356/459, 356/473; 372/94
    See application file for complete search history.

(56) References Cited

U.S. PATENT DOCUMENTS 5,076,694 A  * 12/1991  Aronowitz .................. 356/459
5,283,627 A    2/1994  Karpinski, Jr.
5,335,063 A  *  8/1994  Karpinski, Jr. .............. 356/473
5,359,414 A   10/1994  Howard et al.

FOREIGN PATENT DOCUMENTS

FR         2730307      8/1996
JP         01080839     3/1989

* cited by examiner

*Primary Examiner*—Samuel A. Turner

(57) ABSTRACT

A system for detecting radiation events in a ring laser gyro is provided. The system includes one or more photodetectors, that produce photocurrent signals to monitor the ring laser gyro. Further, the system includes one or more comparator circuits actuating at one or more thresholds. The one or more comparator circuits are responsive to the photodetectors to detect when a radiation event occurs based on the photocurrent signal. The system further includes a path length control circuit responsive to the one or more comparator circuits, that restores operating conditions for the ring laser gyro when a radiation event occurs.

24 Claims, 5 Drawing Sheets

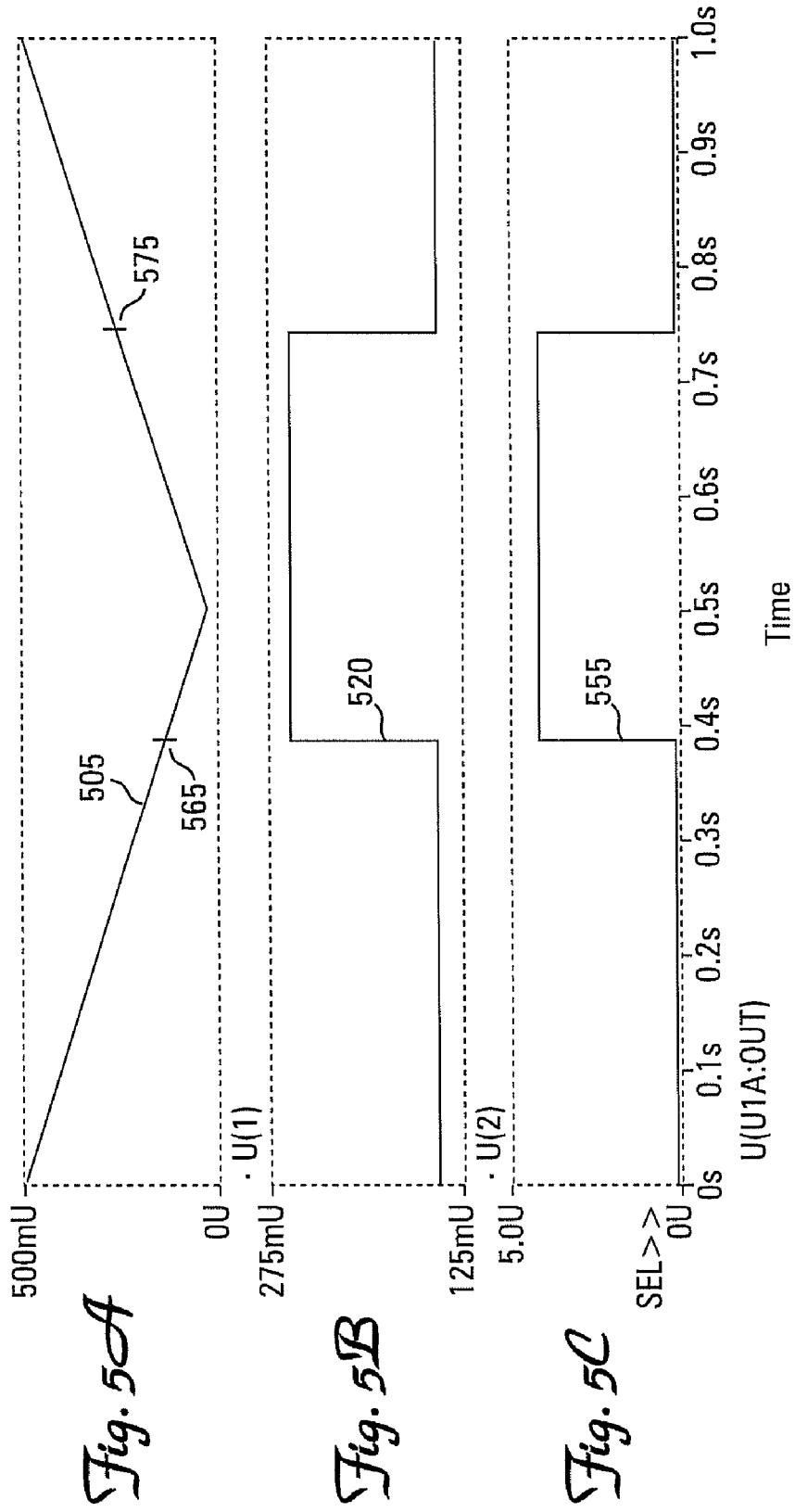

DETECTING RADIATION EVENTS IN A RING LASER GYROSCOPE

GOVERNMENT LICENSE RIGHTS

The U.S. Government may have certain rights in the present invention as provided for by the terms of Contract No. DASG60-00-C-0072 awarded by the Department of the Army.

TECHNICAL FIELD

The present invention relates generally to the field of electronic circuits, and in particular, to systems and methods of detecting radiation events in electronic systems.

BACKGROUND

Ring Laser Gyro ("RLG") devices are a measurement tool used to calculate the angular rotation around a specified axis. A RLG measures the angular rotation around a specified axis by splitting a polarized laser beam in opposite directions within an enclosed cavity and measuring the combined light intensity of the beams. Typically, a RLG uses PIN photo-diodes to monitor laser intensity of the counter propagating beams and subsequently determine the angular rotation.

These RLG systems are on occasion required to operate in harsh radiation environments that can adversely affect the electronic components of the RLG systems. In such environments where prompt dose radiation events may arise, circumvent and recovery procedures in the RLG system that undo the affects of the event, such as, providing charge bleed off paths or initiating a total circumvention of power and subsequent recovery, are necessary. To trigger these recovery procedures, it is often necessary to know of an event's occurrence and location within the RLG system in order to undo the affects of the event on the electronic components of the RLG system.

Typically, radiation detectors are used to determine when and where a radiation event occurred and to trigger the proper recovery procedures within the system. A typical radiation detector detects radiation events by monitoring the current passing through a photodiode. The radiation detector determines that a radiation event has occurred when a large amplitude transient current, inherent to prompt radiation events, is observed to have passed through the photodiode. However, conventional radiation detectors are expensive relative to the low cost of RLG systems. Further, due to market demands, housings for RLG systems are physically very small and the addition of a radiation detector would require a substantial increase in the physical size of the housing.

For the reasons stated above, and for other reasons stated below which will become apparent to those skilled in the art upon reading and understanding the present specification, there is a need in the art for an inexpensive and spatially small radiation event detector.

SUMMARY

Embodiments of the present invention provide a radiation event detector that leverages existing signals and hardware to detect a radiation event. In one embodiment, a system for detecting radiation events in a ring laser gyro is provided. The system includes one or more photodetectors, that produce photocurrent signals to monitor the ring laser gyro. Further, the system includes one or more comparator circuits actuating at one or more thresholds. The one or more comparator circuits are responsive to the photodetectors to detect when a radiation event occurs based on the photocurrent signal. The system further includes a path length control circuit responsive to the one or more comparator circuits, that restores operating conditions for the ring laser gyro when a radiation event occurs.

DRAWINGS

FIG. 5a is a graph of the voltage response of the voltage gain signal during a radiation event.

FIG. 5b is a graph of the voltage response of the threshold signal during a radiation event showing hysteresis of the trip point.

FIG. 5c is a graph of the voltage response of the comparator output during a radiation event.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. In particular, the embodiments and figures described below, describe methods and systems for detecting radiation events within a RLG system. These methods and systems however are not limited to RLG systems and may be applied to other electronic systems without departing from the spirit and scope of the present invention. The following detailed description is, therefore, not to be taken in a limiting sense.

Embodiments of the present invention provide methods and systems for detecting a radiation event. In one or more embodiments, the present invention provides methods for detecting a radiation event within a RLG system. In one or more embodiments, resident PIN photo-diodes within the RLG system adopt the dual role of monitoring RLG laser intensity and indicating when a radiation event occurs. Also, in one or more embodiments, the present invention resides internal to the housing of a standard RLG system. This method does not take up valuable space within the RLG housing, where space is significantly limited. Further this method provides radiation event detection without significant additional costs.

Figure 1:
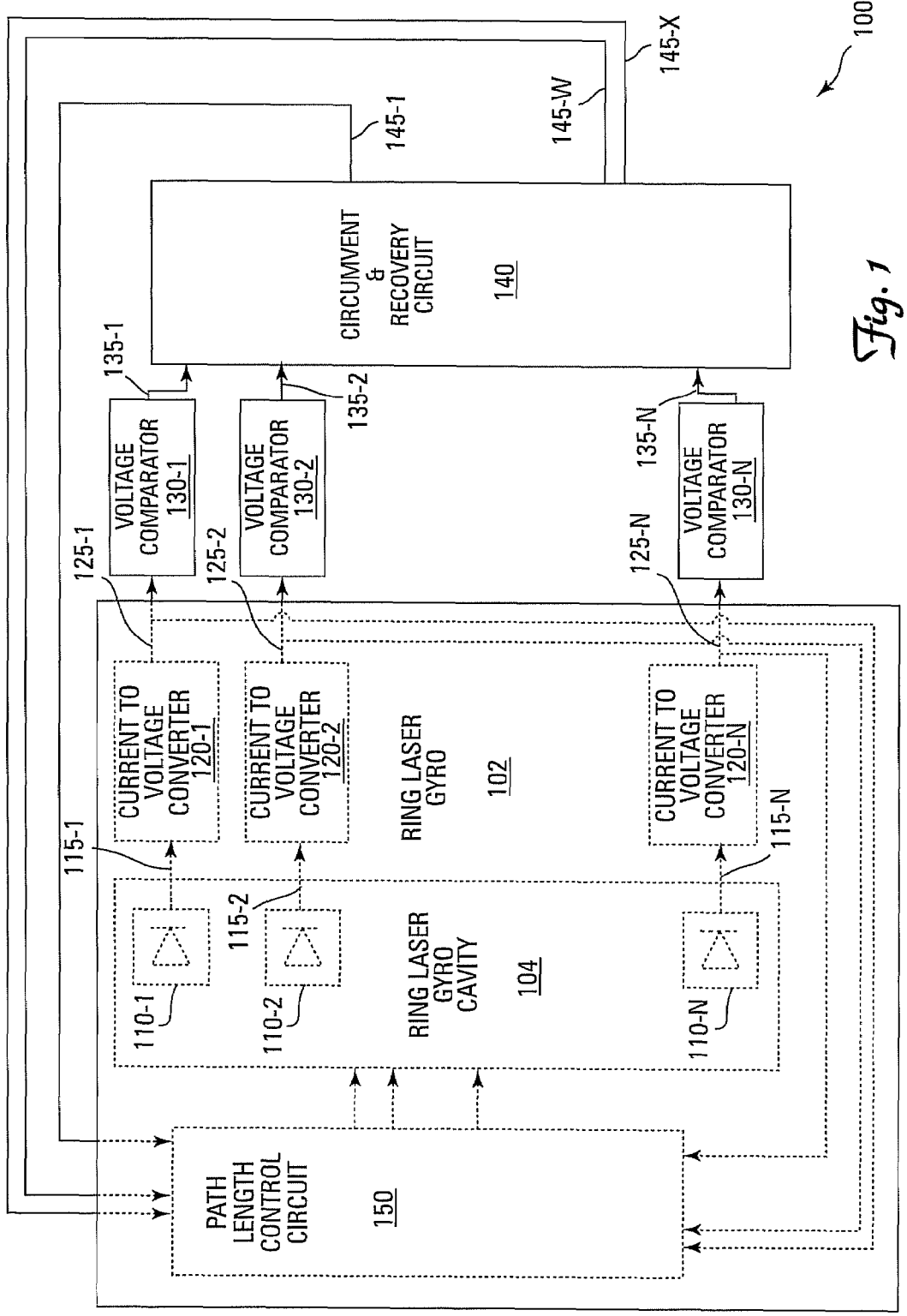
FIG. 1 is a block diagram of a RLG system in accordance with one embodiment of the present invention.

FIG. 1 is a high-level block diagram of a system for detecting radiation events within a ring laser gyro system 100 ("system 100") in accordance with one embodiment of the present invention. In the illustrated embodiment, system 100 comprises a ring laser gyro 102. Ring laser gyro 102 typically comprises a path length control circuit 150, a ring laser gyro cavity 104 and at least one current to voltage converter 120-1 to 120-N. Ring laser gyro cavity 104 houses one or more photodetectors 110-1 to 110-N. In one embodiment, the photodetectors 110-1 to 110-N are PIN photodiodes. Typically, a ring laser gyro uses three PIN photodiodes housed within ring laser gyro cavity 104. Each photodetector 110-1 to 110-N is coupled to one or more current to voltage converter circuits 120-1 to 120-N.

Photodetectors 110-1 to 110-N produce a photocurrent signal 115-1 to 115-N that is based on the amount of light received by the photodetector. Each of the one or more current to voltage converter circuits 120-1 to 120-N are adapted to continuously receive photocurrent signals 115-1 to 115-N from photodiodes 110-1 to 110-N. Also, each of the one or more current to voltage converter circuits 120-1 to 120-N are coupled to a corresponding voltage comparator circuit 130-1 to 130-N as well as to path length control circuit 150. Alternate configurations could use a plurality of voltage comparators (130-N-I) connected to an individual current to voltage converter (120-N) to resolve multiple prompt radiation levels allowing tailored circumvention and recovery actions based upon the radiation environment magnitude. This additional architecture complexity will not be detailed in the figures since the present invention provides a method for detecting a radiation event within a RLG system whose specific PIN diode response to a prompt radiation event would saturate before allowing sufficient resolution between dose environment levels. Other photodiode based systems could allow leveraging of the multiple threshold architecture.

Each of the one or more current to voltage converter circuits 120-1 to 120-N produce voltage output signals 125-1 to 125-N based on photocurrent signals 115-1 to 115-N. Voltage output signals 125-1 to 125-N are then sent to its corresponding voltage comparator circuit 130-1 to 130-N as well as to path length control circuit 150. Path length control circuit 150 uses voltage output signals 125-1 to 125-N to adjust the path lengths of the beams within the ring laser gyro cavity 104 by shifting its mirrors to keep the ring laser gyro tuned.

System 100 also comprises a circumvent and recovery circuit 140 with N inputs coupled to each of the one or more voltage comparator circuits 130-1 to 130-N. In one embodiment, circumvent and recovery circuit 140 is embodied in a Field Programmable Gate Array ("FPGA") having program code for implementing circumvent and recovery procedures tailored based upon known circuit responses to prompt dose environments. Circumvent and recovery circuit 140 is adapted to receive one or more event detection signals 135-1 to 135-N from each voltage comparator circuit 130-1 to 130-N. Circumvent and recovery circuit 140 is also coupled to path length control circuit 150. Path length control circuit 150 is adapted to receive one or more instruction signals 145-1 to 145-X from circumvent and recovery circuit 140 that allows system 100 to implement appropriate circumvent and recovery procedures based on the occurrence of a radiation event. In other embodiments, circumvent and recovery circuit 140 is coupled to other circuitry within system 100.

System 100 monitors signals from photodetectors 110-1 to 110-N to determine when a radiation event occurs so that proper circumvent and recovery procedures can be implemented. In operation, photodetectors 110-1 to 110-N continuously monitor RLG laser intensity by sending photocurrent signals 115-1 to 115-N to current to voltage converter circuits 120-1 to 120-N. In general, photocurrent levels are significantly greater during a prompt radiation event. Typically, under normal operating conditions, photocurrent signals 115-1 to 115-N are on the order of 3 µA. During a prompt radiation event, photocurrent signals 115-1 to 115-N can rise to be on the order of 9 µA or more. Each current to voltage converter circuits 120-1 to 120-N transforms the corresponding photocurrent signal 115-1 to 115-N into a voltage output signal 125-1 to 125-N.

Each voltage output signal 125-1 to 125-N is then sent to the corresponding voltage comparator circuit 130-1 to 130-N. In one embodiment, each of the one or more voltage comparator circuits 130-1 to 130-N is set to compare voltage output signals 125-1 to 125-N with a selected threshold voltage. When at least one of the voltage output signals 125-1 to 125-N crosses the selected threshold voltage a radiation event has occurred. Under normal operating conditions, voltage comparator circuits 130-1 to 130-N continuously produce corresponding event detection signals 135-1 to 135-N that signify no radiation event has occurred. However, when at least one of the voltage comparator circuits 130-1 to 130-N discover that their corresponding voltage output signals 125-1 to 125-N crosses the predefined threshold voltage, voltage comparator circuits 130-1 to 130-N produce event detection signals 135-1 to 135-N with a second, different value that indicates a radiation event has occurred. In some embodiments, voltage comparator circuits 130-1 to 130-N provide a low voltage event detection signal during normal operation of approximately 0 volts, and a high voltage event detection signal during a prompt radiation event of approximately 5 volts.

Event detection signals 135-1 to 135-N are then sent to circumvent and recovery circuit 140. In some embodiments, circumvent and recovery circuit 140 is a FPGA that places event detection signals 135-1 to 135-N into a corresponding input within the FPGA. When one or more of event detection signals 135-1 to 135-N show that a radiation event was detected, circumvent and recovery circuit 140 uses the FPGA to determine the appropriate recovery procedure required and to produce one or more instruction signals 141-1 to 145-X. In this embodiment the FPGA produced 145-1 and 145-W to 145-X. Circumvent and recovery circuit 140 can then use the programmed logic within the FPGA to send the specified signals 145-1 and 145-W to 145-X from instruction signals 145-1 to 145-X to PLC 150 to place one or more of the PLC channels into track mode to bleed erroneous charge or provide total circumvention of power and subsequent recovery. One beneficial aspect of this method is that the FPGA monitors each event detection signal 135-1 to 135-N through a separate input and has the ability to determine precisely which of the one or more photodetectors were affected by the radiation event. This allows users to analyze how and where radiation events are affecting ring laser gyro 102.

Figure 2:
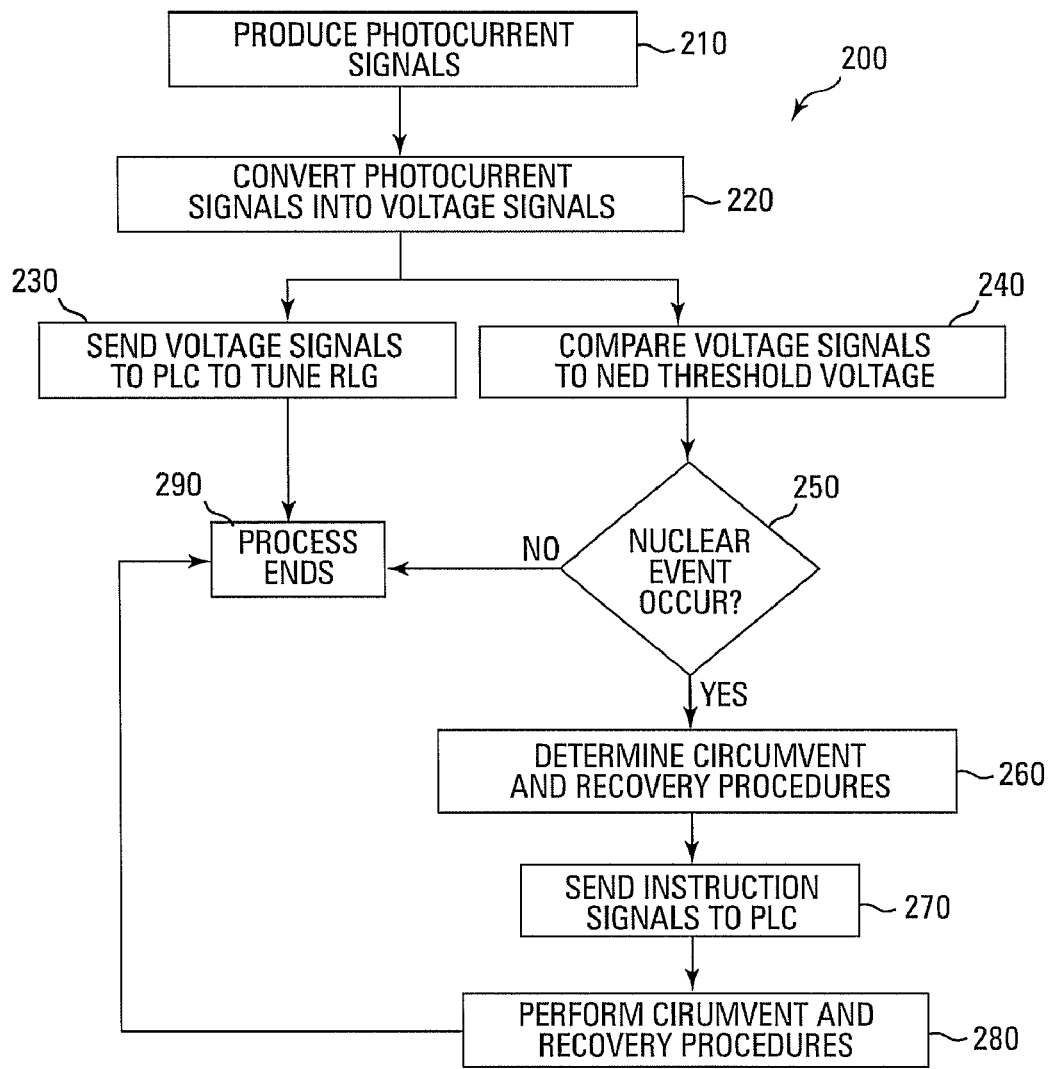
FIG. 2 is a flow chart of one embodiment of a process for detecting and compensating for a radiation event in a RLG system.

FIG. 2 is a flow chart that illustrates one embodiment of a method 200 for detecting radiation events within a ring laser gyro according to the teachings of the present invention. Method 200 begins at block 210, where photodetectors, e.g., PIN photodiodes, produce photocurrent signals. In one embodiment, photodetectors continuously produce photocurrent signals, thus causing method 200 to run continuously. At block 220, photocurrent signals are converted to voltage output signals by current to voltage converters.

At block 230, voltage output signals are sent from current to voltage converters to a path length control circuit to tune the ring laser gyro. The method then proceeds to block 290 where the process ends. Voltage output signals are also sent from current to voltage converters to voltage comparators, shown in block 240, to compare voltage output signals to a predetermined threshold voltage to determine whether a radiation event occurred. At block 250, the method determines whether a radiation event occurred. If no radiation event has occurred the method proceeds to block 290 where the process ends. If, however, a radiation event has occurred the method proceeds to block 260.

At block 260, the method determines the circumvent and recovery procedures to be used by ring laser gyro due to the radiation event. In one embodiment, circumvent and recovery procedures are determined by a circumvent and recovery circuit, which uses an FPGA that determines which instruction signals are to be used. The method then proceeds to block 270 which sends selected instruction signals, determined by the circumvent and recovery circuit, to the path length control circuit. The path length control circuit then performs the necessary circumvent and recovery procedures, shown in block 280, and proceeds to block 290 where the process ends.

Figure 3:
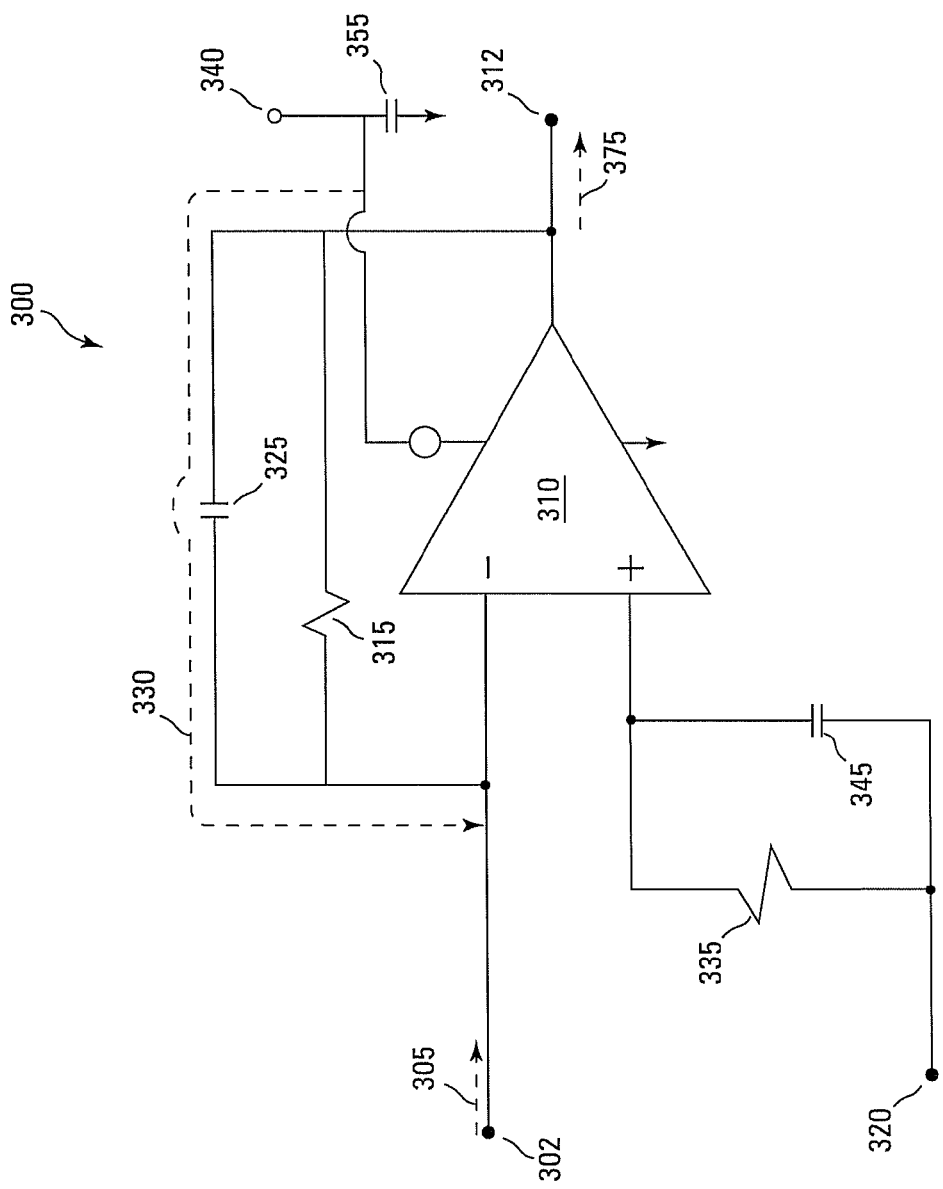
FIG. 3 is a circuit diagram of one embodiment of a current to voltage converter circuit according to the teachings of the present invention.

FIG. 3 depicts a circuit diagram of one embodiment of a current to voltage converter circuit, shown generally at 300, according to the teachings of the present invention. In the illustrated embodiment, current to voltage converter circuit 300 comprises an amplifier 310, a reference voltage node 320 and a feedback network 330. In one embodiment reference voltage node 320 can fluctuate between 3.71 and 4.10 volts. Input node 302 receives a photocurrent signal 305 from a photodetector, e.g., one of photodetectors 110-1 to 110-N, and sends the photocurrent signal 305 to the inverting input of amplifier 310. In one embodiment, under normal operating conditions, photocurrent signal 305 is on the order of 3 μA. During a prompt radiation event, photocurrent signal 305 can rise to 9 μA and beyond. The output node 312 is connected to the inverting input of amplifier 310 through feedback network 330. Feedback network 330 includes a feedback resistor 315 in parallel with a feedback capacitor 325. The resistance value for feedback resistor 315 is based around setting voltage output signal 375 within selected levels. In one embodiment feedback resistor 315 is on the order of 1 MΩ. Feedback capacitor 325 provides feedback stability to feedback network 330 by creating a high pass filter with feedback resistor 315. In one embodiment, feedback capacitor 325 is on the order of 2 pico-farads based on the particular amplifier 310, e.g., the capacitance is small enough to keep the bandwidth commensurate with the prompt dose response time. In other embodiments feedback resistor 315 and feedback capacitor 325 will have different values based on the type of amplifier 310 used as well as the desired voltage levels for voltage output signal 375. The reference voltage node 320 is coupled in series to a parallel resistor 335 capacitor 345 pair which are coupled to the non-inverting input of amplifier 310. In one embodiment resistor 335 is on the order of 1 MΩ and capacitor 345 is on the order of 0.01 μF. The positive power supply input of amplifier 310 is coupled to a positive power supply 340 with decoupling capacitor 355 with a capacitance in the range from 0.01 to 0.1 micro-farads. By exactly matching the impedance network that exists on the inverting side of amplifier 310 one ensures that the bias currents (Ibias) associated with amplifier 310 do not result in an error term in the form of an presented offset voltage. This is of particular concern when prompt radiation environments result in large induced Ibias transients. In one embodiment, positive power supply 340 is 5 volts. The negative power supply input of amplifier 310 is coupled to ground. The output of amplifier 310 is set to continuously produce a voltage output signal 375.

Current to voltage converter circuit 300 inputs current signals from a PIN photodiode and outputs voltage output signal 375 to be sent to a voltage comparator circuit. In operation, amplifier 310 has a high input resistance through both its inverting and non-inverting inputs. Thus, almost the entirety of photocurrent signal 305 travels through feedback circuit 330 with a limited amount of current traveling into inverting input of amplifier 310. Therefore, voltage output signal 375 at the output of amplifier 310 is approximated by the equation $V_o = VREF - I_p RREF$. In this equation Vo is the voltage at output signal 375, VREF is the voltage at voltage reference node 320, Ip is photocurrent signal 305 and RREF is feedback resistor 315. For example, in this embodiment, under normal operating conditions voltage output signal 375 stays above 640 mV and during a radiation event voltage output signal 375 drops below 40 mV.

Figure 4:
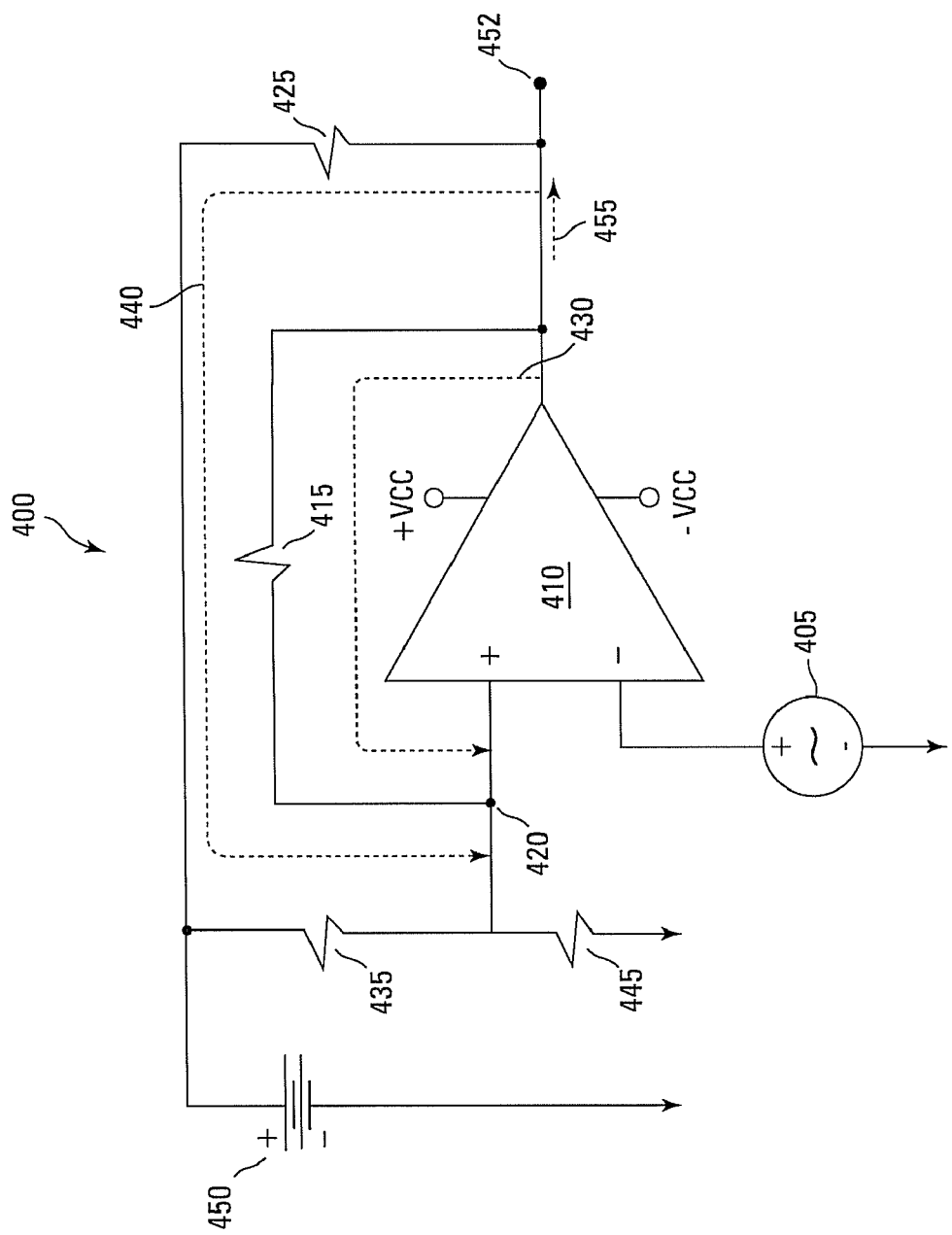
FIG. 4 is a circuit diagram of one embodiment of a voltage comparator circuit according to the teachings of the present invention.

FIG. 4 illustrates a circuit diagram of one embodiment of a comparator, shown generally at 400, according to the teachings of the present invention. In this illustrated embodiment, comparator 400 comprises a voltage reference 450, an amplifier 410, feedback network 430, and open collector pull-up resistor 440. A voltage output signal 405 is sent to the inverting input of amplifier 410. Output node 452 is connected to the non-inverting input 420 of amplifier 410 through feedback network 430. Feedback network 430 has a resistor 415 coupled between output of amplifier 410 to non-inverting input of amplifier 410 to establish noise immunity through threshold hysteresis. In one embodiment resistor 415 is 7.5 kΩ. The output node 452 of amplifier 410 has its open collector output pulled up to the desired logic high reference through resistor 425. In one embodiment voltage reference 450 is set to 5 volts. Resistors 435 and 445 act as a resistor divider working against reference 450 and establish the nominal comparator trip threshold. In one embodiment resistor 435 is 33.2 kΩ. Resistor 445 is coupled between non-inverting input node 420 and ground. In one embodiment resistor 445 is 1 kΩ. In one embodiment positive power supply input of amplifier 410 is set to 15 volts and negative power supply input of amplifier 410 is set to −15 volts. The output of amplifier 410 continuously produces an event detection signal 455. In some embodiments, under normal operating conditions, amplifier 410 produces a low voltage event detection signal 455 and during a radiation event, amplifier 410 produces a high voltage event detection signal.

Voltage comparator circuit 400 inputs a voltage output signal from a current to voltage converter and outputs an event detection signal 455. Event detection signal 455 is sent to a circumvent and recovery circuit to determine whether a radiation event occurred so that proper circumvent and recovery procedures can be implemented. In one embodiment, amplifier 410 produces a low voltage event detection signal 455 under normal operating conditions. In one embodiment, low voltage event detection signal 455 is approximately 0 volts. However, when a radiation event occurs signified when the voltage output signal 405 drops below the non-inverting input node 420 set by resistors 435 and 445 and by hysteresis feedback through resistor 415, amplifier 410 produces a high voltage event detection signal 455. In one embodiment, when the voltage output signal 405 drops below non-inverting input node 420 low threshold voltage, for example 144 mV in this embodiment, event detection signal 455 is set to 5 volts. The event detection signal 455 will remain high until voltage output signal 405 rises above non-inverting input node 420 set by resistors 415, 425, and 445. In one embodiment, when the output signal 405 rises above a high threshold voltage of 259 mV for non-inverting input node 420, amplifier 410 produces a low event detection signal 455, indicating the RLG has returned to normal operating conditions.

FIGS. 5a, 5b and 5c are graphs that illustrate an example of voltage responses at various nodes of a comparator circuit, such as voltage comparator circuit 400, during a radiation event according to the teachings of the present invention. Curve 505 in FIG. 5a represents one example of the input to a comparator circuit, such as voltage output signal 405 described above. In one embodiment, when a radiation event occurs, curve 505 drops below a low voltage threshold level 565 set at 144 mV. After the radiation event has ended, curve 505 begins to rise above a high voltage threshold level 575 set at 269 mV. Curve 520 in FIG. 5b depicts the voltage response at non-inverting input 420 of voltage comparator circuit 400 during the time span of a radiation event. Curve 555 of FIG. 5c represents one example of the output of a comparator circuit, such as event detection signal 455 found at output node 452 as described above. Curve 555 depicts the voltage response of event detection signal 455 during the time span of a radiation event.

In this embodiment, as voltage output signal curve 505 drops in voltage from 500 mV for the first 0.38 seconds, non-inverting input node curve 520 and event detection signal curve 555 remain at a constant voltage, in this embodiment for example at 144 mV and 0 volts respectively. In this embodiment of voltage comparator circuit 400, when voltage output signal curve 505 drops below low voltage threshold level 565, in this example 144 mV, event detection signal curve 555 and non-inverting input node curve 520 immediately spike to approximately 4.8 volts and 269 mV respectively, indicating that a radiation event has occurred. As voltage output signal curve 505 rises in voltage, non-inverting input node curve 520 and event detection signal curve 555 remain constant at approximately 269 mV and 4.8 volts, until voltage output signal curve 505 rises above high threshold voltage 575, in this embodiment, approximately 269 mV. When voltage output signal curve 505 rises above high voltage threshold level 575 of approximately 269 mV, non-inverting node curve 520 and event detection signal curve 555 quickly drop to approximately 144 mV and 0 volts respectively, indicating that the radiation event has passed and RLG system 200 is under normal operating conditions. The implementation of both low voltage 565 and high voltage threshold level 575 instead of a single voltage threshold level is to create hysteresis. Hysteresis prevents voltage comparator circuit 400 from producing errant event detection signals created by noise fluctuating above and below a single voltage threshold level.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system for detecting radiation events in a ring laser gyro, the system comprising:
    one or more photodetectors, that produce photocurrent signals to monitor the ring laser gyro;
    one or more comparator circuits actuating at one or more thresholds, the one or more comparator circuits responsive to the photodetectors to detect when a radiation event occurs based on the photocurrent signal; and
    a path length control circuit responsive to the one or more comparator circuits, that restores operating conditions for the ring laser gyro when a radiation event occurs.

2. The system of claim 1, further comprises one or more current to voltage converter circuits coupled between the one or more photodetectors and the one or more comparator circuits that convert photocurrent signals from the photodetectors into voltage signals.

3. The system of claim 2, wherein the comparator circuit is a voltage comparator circuit.

4. The system of claim 2, wherein the one or more current to voltage converters are coupled to the path length control circuit to provide operational signals to the path length control circuit to keep the ring laser gyro tuned.

5. The system of claim 1, further comprises a circumvent and recovery circuit coupled to the one or more comparator circuits that produces instruction signals when a radiation event is detected.

6. The system of claim 5, wherein the circumvent and recovery circuit is implemented in a field programmable gate array (FPGA).

7. The system of claim 5, wherein the circumvent and recovery circuit is coupled to the path length control circuit such that the circumvent and recovery circuit sends instruction signals to the path length control circuit when a radiation event is detected.

8. The system of claim 1, wherein the photodetectors comprise PIN photodiodes.

9. The system of claim 1, wherein photocurrent signals from photodetectors are on the order of 3 μA when no radiation event occurs and on the order of 9 μA when a radiation event does occur.

10. A method for detecting radiation events within a ring laser gyro, the method comprising:
    monitoring photocurrent signals produced by photodetectors in the ring laser gyro;
    determining whether a radiation event occurred based on the photocurrent signal; and
    executing circumvent and recovery procedures when a radiation event occurs.

11. The method of claim 10, wherein determining whether a radiation event occurred comprises converting photocurrent signals into voltage signals.

12. The method of claim 11, wherein determining whether a radiation event occurred comprises comparing the voltage signals to a selected threshold voltage.

13. The method of claim 11, further comprising sending the voltage signals to a path length control circuit to tune the ring laser gyro.

14. The method of claim 10, wherein photodetectors operate continuously.

15. The method of claim 10, wherein executing circumvent and recovery procedures comprises selecting the circumvent and recovery procedures for the ring laser gyro.

16. The method of claim 15, wherein executing circumvent and recovery procedures comprises creating instruction signals based on the selected circumvent and recovery procedures for the ring laser gyro.

17. A method for compensating for radiation events within a ring laser gyro, the method comprising:
    generating photocurrent signals in the ring laser gyro;
    using the photocurrent signals to tune the ring laser gyro;
    determining when the photocurrent signals exceed a selected threshold; and
    when the photocurrent signals exceed the threshold, executing circumvent and recovery procedures to compensate for a radiation event.

18. The method of claim 17, wherein using the photocurrent signals to tune the ring laser gyro comprises providing the photocurrent signals to a path length control circuit.

19. The method of claim 17, and further including converting the photocurrent signals to a voltage signals before comparing the photocurrent signals with a threshold.

20. The method of claim 17, wherein determining when the photocurrent signals exceed a selected threshold comprises:
converting the photocurrent signal to a voltage;
comparing the voltage with a first threshold to determine when a radiation event begins; and
comparing the voltage with a second threshold to determine when the radiation event has ended.

21. The method of claim 20, wherein the first and second thresholds are chosen to introduce hysteresis into the determination of when the photocurrent signals exceed a selected threshold.

22. A system for detecting radiation events in an electronic circuit, the system comprising:
one or more photodetectors, that produce photocurrent signals within the electronic circuit;
one or more comparator circuits responsive to the photodetectors, that detects when a radiation event occurs;
a control circuit responsive to the one or more comparator circuits, that restores operating conditions for the electronic circuit when a radiation event occurs.

23. The system of claim 22, wherein the one or more photodetectors comprise a plurality of PIN diodes.

24. A system for detecting radiation events in a ring laser gyro, the system comprising:
one or more PIN photodiodes that produce photocurrent signals to monitor the ring laser gyro;
one or more current to voltage converter circuits, each responsive to an associated one of the one or more PIN photodiodes;
a path length control circuit responsive to the one or more current to voltage converters, the path length control circuit adapted to tune the operation of the ring laser gyro;
a radiation detection circuit, including:
one or more comparator circuits, responsive to the one or more current to voltage converters, that detects when a radiation event occurs, a circumvent and recovery circuit, responsive to the one or more comparator circuits, the circumvent and recovery circuit coupled to the path length control circuit;
wherein the circumvent and recovery circuit provides signals to the path length control circuit that restore operating conditions for the ring laser gyro when a radiation event occurs.

* * * * *